US008639749B2

(12) United States Patent
Chen et al.

(10) Patent No.: US 8,639,749 B2
(45) Date of Patent: Jan. 28, 2014

(54) PLATFORM INDEPENDENT INFORMATION HANDLING SYSTEM, COMMUNICATION METHOD, AND COMPUTER PROGRAM PRODUCT THEREOF

(75) Inventors: Li-Ju Chen, Taipei (TW); Yu-Jin Chen, Taipei (TW); Yuan-Shyang Lee, Taipei (TW); Rick M F Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 13/173,468

(22) Filed: Jun. 30, 2011

(65) Prior Publication Data

US 2012/0005267 A1 Jan. 5, 2012

(30) Foreign Application Priority Data

Jun. 30, 2010 (TW) ............................. 99121468 A (51) Int. Cl.
*G06F 15/16* (2006.01)
(52) U.S. Cl.
USPC .......................................................... 709/203
(58) Field of Classification Search
USPC ........................................ 715/864; 709/203
See application file for complete search history.

(56) References Cited

U.S. PATENT DOCUMENTS

| | | | | |
|---|---|---|---|---|
| 6,078,314 | A * | 6/2000 | Ahn ............................... | 345/169 |
| 6,259,447 | B1 * | 7/2001 | Kanetake et al. .............. | 715/764 |
| 6,981,045 | B1 | 12/2005 | Brooks | |
| 7,155,381 | B2 * | 12/2006 | Ryzl ............................... | 703/24 |
| 7,324,838 | B2 * | 1/2008 | Tarle .............................. | 455/566 |
| 7,451,409 | B2 * | 11/2008 | Eizips ........................... | 715/856 |
| 7,636,792 | B1 | 12/2009 | Ho | |
| 7,685,257 | B2 | 3/2010 | King et al. | |
| 7,688,327 | B2 | 3/2010 | Robotham et al. | |
| 8,010,701 | B2 * | 8/2011 | Wilkinson et al. ............ | 709/245 |
| 8,181,118 | B2 * | 5/2012 | Potts et al. ..................... | 715/792 |
| 2002/0032751 | A1 | 3/2002 | Bharadwaj | |
| 2004/0217980 | A1 * | 11/2004 | Radburn et al. ............... | 345/672 |
| 2006/0184614 | A1 | 8/2006 | Baratto et al. | |
| 2007/0061488 | A1 | 3/2007 | Alagappan et al. | |
| 2008/0082604 | A1 | 4/2008 | Mansour et al. | |
| 2008/0201478 | A1 | 8/2008 | Yao et al. | |
| 2008/0201479 | A1 * | 8/2008 | Husain et al. ................. | 709/227 |
| 2009/0043840 | A1 | 2/2009 | Cherukuri et al. | |

FOREIGN PATENT DOCUMENTS

| | | |
|---|---|---|
| TW | 200847725 | 12/2008 |
| WO | 02/15617 | 2/2002 |
| WO | 03/003688 | 1/2003 |

OTHER PUBLICATIONS

Microsoft, How Terminal Services Works, Mar. 28, 2003, pp. 1-17.*
Joeng Kim, Ricardo A. Baratto and Jason Nieh, "pTHINC: a thin-client architecture for mobile wireless web," International World Wide Web conference Committee, May 23-26, 2006.
Ivica Arsov, Marius Preda and Francoise Preteau, "A Server-Assisted Approach for Mobile-Phone Games," ARTEMIS Department, Institut TELECOM/TELECOM & Management SudParis, France.

* cited by examiner

*Primary Examiner* — Lance L Barry
(74) *Attorney, Agent, or Firm* — Convergent Law Group LLP (57) ABSTRACT

An approach is provided for communications between a device and a server in a service system where data and application are stored and executed by a plurality of computing systems in the internet. The approach includes transmitting, via the device, a request of a selected application to the server; in response to the request, transmitting, via the server, a graphical image indicative of an execution of the selected application to the device.

10 Claims, 10 Drawing Sheets

PLATFORM INDEPENDENT INFORMATION HANDLING SYSTEM, COMMUNICATION METHOD, AND COMPUTER PROGRAM PRODUCT THEREOF

CROSS-REFERENCE TO RELATED APPLICATIONS

This application is based on and claims the benefit of priority from Taiwan Patent Application 99121468, filed Jun. 30, 2010.

BACKGROUND

The present invention relates generally to information technology, and more particularly, to a platform independent communication.

Mobile devices, such as notebooks, mobile phones, handheld devices, navigating devices, wearable computers, in recent years are fast developing and relatively popular. Nowadays, the users may access the internet via the mobile devices (such as mobile phones or PDAs) to read the web pages customized respectively for various mobile devices. The mobile devices may achieve various mobile applications, such as information managements, audio/video entertainments, business transactions, and so on.

For the current mobile devices, there are some major limitations. First, the CPU and memory restrictions of the mobile devices adversely limit the executions of the applications thereon, and thus it's may be problematic to run complicated applications on the mobile devices. Second, due to the memory restrictions, it's not easy to install many applications on the mobile devices as we usually do in the laptops/desktops (in others words, the installation of many applications on the mobile devices, compared with that of many applications on the laptops/desktops, is not satisfactory. Third, there are various mobile devices with various operating systems (OS) and hardware specifications (especially CPUs) in the current market, and typically various applications may be only executable on specific operating systems and mobile devices. It's desired for application developers to develop an application available on various mobile devices/operating systems/hardware.

Thus, it is advantageous to provide a device/OS/platform independent information handling system, communication method, and computer program product so that a universal environment for providing various applications to the users.

BRIEF SUMMARY

In one aspect, an embodiment of the present invention provides a method of a communication between a server and a device by: transmitting, via the device, a request of a selected application to the server; and in response to the request, transmitting, via the server, a graphical image indicative of an execution of the selected application to the device.

In another aspect, one embodiment of the present invention provides an information handling system in response to a request of a first device. The request may be corresponding to an application. The information handling system may comprise a plurality of device emulators corresponding to a plurality of devices, respectively emulating functions and displays of the plurality of devices; a device application handler for receiving the request of the first device and transmitting the request to the device emulator corresponding to the first device; wherein the device emulator corresponding to the first device generates a graphical image indicative of an execution of the application and the device application handler transmits the graphical image to the first device.

BRIEF DESCRIPTION OF THE DRAWINGS

A more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java®, Smalltalk, C++ or the like and conventional procedural programming languages, such as the "C" programming language or similar programming languages. ("Java" is a registered trademark of Sun Microsystems, Inc. in the United States, other countries, or both.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
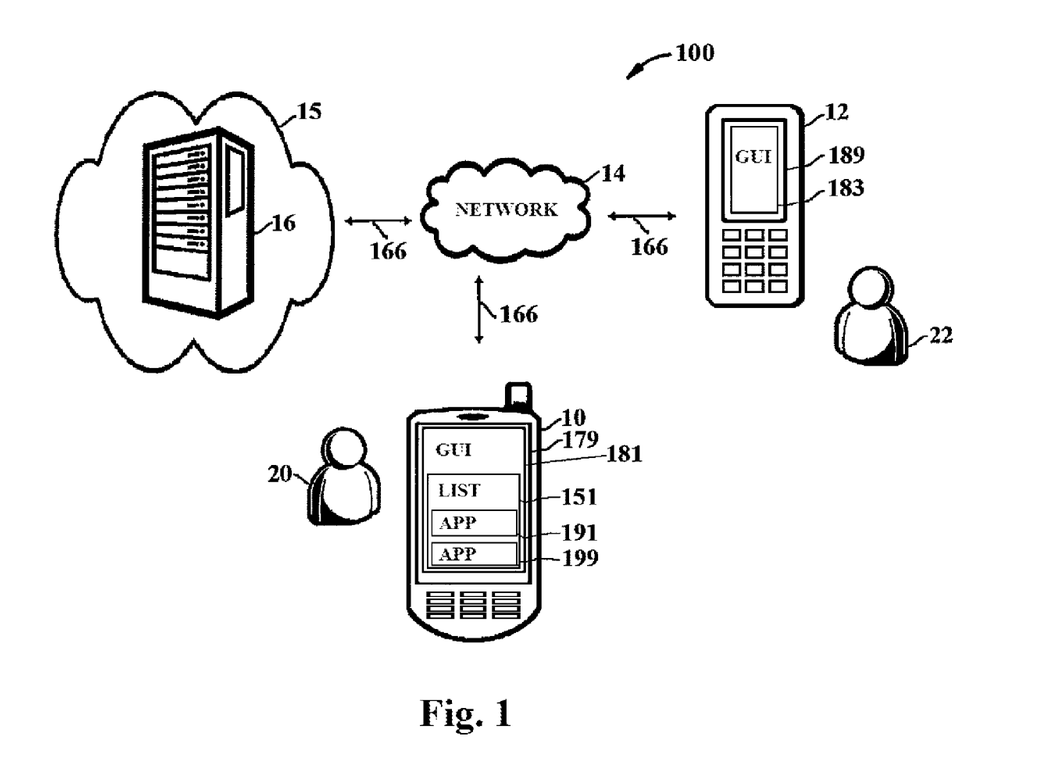
FIG. 1 is an exemplary diagram of a system according to an embodiment of the present invention.
Figure 2:
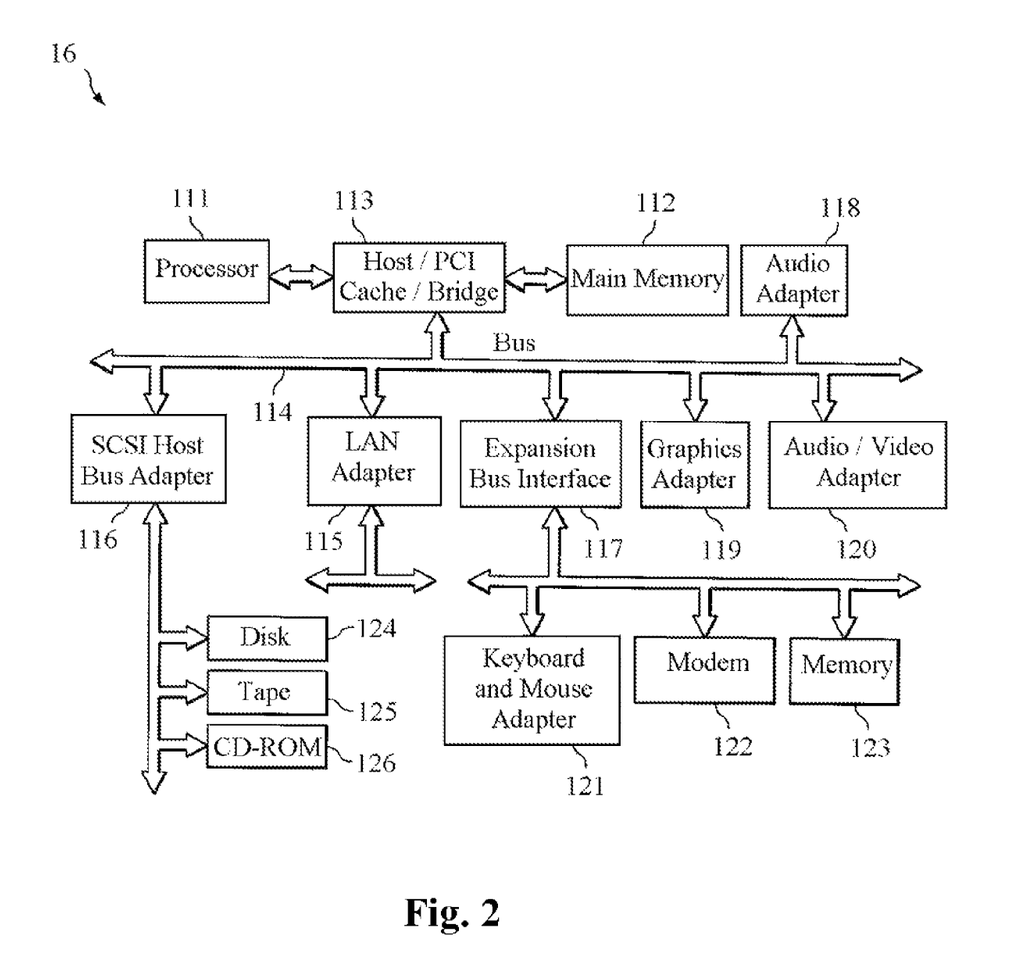
FIG. 2 is an exemplary diagram of an information handling system according to an embodiment of the present invention.
Figure 3:
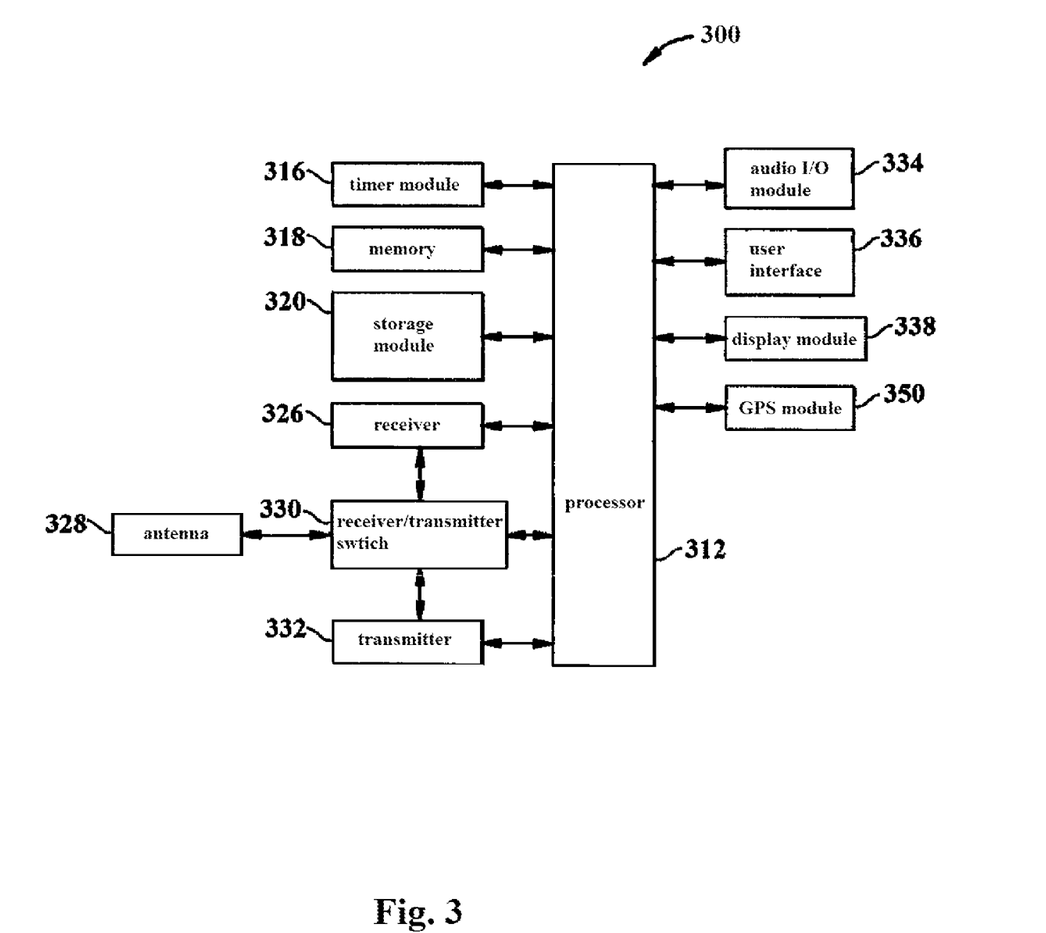
FIG. 3 is an exemplary diagram of a mobile device according to an embodiment of the present invention.

Referring now to FIG. 1 through FIG. 3, devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is illustrates exemplary diagram of a system 100 according to an embodiment of the present invention, and the system 100 may include a service cloud 15 having at least an information handling system 16, such as a server, and a plurality of devices 10 through 12 capable of communicating with the information handling system 16. FIG. 2 illustrates an exemplary diagram of the information handling system 16 according to an embodiment of the present invention. FIG. 3 illustrates an exemplary diagram of one of the devices 10 through 12 according to an embodiment of the present invention.

The devices 10 through 12 are capable of communicating with the server 16 via a wire/wireless network 14. The device 10 executes an application in response to a request of a user 20, and the device 22 executes an application in response to a request of another user 22. The devices 10 through 12 are mutually connected and communicated via any combinations of any hardware structures and software protocols, for example but not limited to Internet and TCP/IP, or other interconnecting technologies without affecting the embodiment of the present invention. The devices 10 through 12 respectively have a display unit 179 through 189 for user interaction of the users 20 through 22.

The exemplary wire/wireless network 14 may be but not limited to a wire network, a mobile phone network, a mobile text message device network, a pager network, or the like. The communications standard of the wire/wireless network 14 may be but not limited to TDMA (Time Division Multiple Access), CDMA (Code Division Multiple Access), GSM (Global System for Mobile Communications), GPRS (General Packet Radio Service), FDMA (Frequency Division Multiple Access), or the like. Any number of devices 10 through 12 may be supported by the wire/wireless network 14. The devices 10 through 12 may be but not limited to mobile phones, push-to-talk mobile phones, pagers, text message devices, email message devices, desktops, laptops, tablet computers, handheld computers, servers, or the like. The services used by the devices 10 through 12 may be but not limited by the first generation analog mobile phone service, the second generation digital mobile phone service, the third generation Internet mobile phone service (3G), the fourth generation broadband service (4G), or the like.

In the exemplary embodiment, the wire/wireless network 14 may provide various functions, such as digital wireless phone service, two-way digital radio, message and data/fax capabilities using internet related technology. The wire/wireless devices 10 through 12 may include various features, such as including voice command, speakerphone, phone book, voice mail, digital two-way radio, Internet, e-mail, wireless modems, voice recordings, or the like.

In the exemplary embodiment, the service cloud 15 is a solution of cloud computing, and it may dynamically process a large number of services or applications. When a request for a new service or application is received, the service cloud 15 may allow several pre-existing services or applications to serve the request. On the other way, the cloud computing is a model for enabling convenient, on-demand network access to a shared pool of configurable computing resources (e.g., networks, servers, storage, applications, and services) that can be rapidly provisioned and released with minimal management effort or service provider interaction.

In the exemplary embodiment, the service cloud 15 may include plural information handling systems 16, such as servers. As shown in FIG. 2, an exemplary diagram of an information handling system 16 according to an embodiment of the present invention is depicted. In this example, the information handling system 16 is a general-purpose computer, in which code or instructions implementing processes of the present invention may be located. The information handling system 16 employs a peripheral component interconnect (PCI) local bus architecture. Although the depicted example employs a PCI bus, other bus architectures such as Accelerated Graphics Port (AGP) and Industry Standard Architecture (ISA) may be used. Processor 111 and main memory 112 are connected to PCI local bus 114 through PCI bridge 113. PCI bridge 113 also may include an integrated memory controller and cache memory for processor 111. Additional connections to PCI local bus 113 may be made through direct component interconnection or through add-in boards.

In the depicted example, local area network (LAN) adapter 115, small computer system interface (SCSI) host bus adapter 116, and expansion bus interface 117 are connected to PCI local bus 114 by direct component connection. In contrast, audio adapter 118, graphics adapter 119, and audio/video adapter 120 are connected to PCI local bus 114 by add-in boards inserted into expansion slots. Expansion bus interface 117 provides a connection for a keyboard and mouse adapter 121, modem 122, and additional memory 123. SCSI host bus adapter 116 provides a connection for hard disk drive 124, tape drive 125, and CD-ROM drive 130. Typical PCI local bus implementations will support three or four PCI expansion slots or add-in connectors.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system. For example, the first information handling system 184, if optionally configured as a network computer, may omit SCSI host bus adapter 116, hard disk drive 124, tape drive 125, and CD-ROM 126. In that case, the computer, to be properly called a client computer, includes some type of network communication interface, such as LAN adapter 115, modem 122, or the like. The depicted example in FIG. 2 and above-described examples are not meant to imply architectural limitations. An operating system runs on processor 111 and is used to coordinate and provide control of various components within the information handling system 16. The operating system may be a commercially available operating system such as Windows XP®. An object oriented programming system such as Java® may run in conjunction with the operating system and provides calls to the operating system from Java® programs or applications executing on the information handling system 16. Instructions for the operating system, the object-oriented programming system, and applications or programs are located on storage devices, such as hard disk drive 124, and may be loaded into main memory 112 for execution by processor 111.

According to a preferred embodiment of the present invention, the devices 10 through 12 may be but not limited to a mobile device 300 as shown in FIG. 3. In the depicted example, the mobile device 300 may be but not limited to a two-way radio capable of receiving and transmitting radio frequency signals over a communication channel under a communications protocol such as TDMA, CDMA, GSM, GPRS, FDMA, or the like.

The processor 312 in FIG. 3 may comprise a single processor or plural processors for performing the tasks described in the following. The mobile device 300 may operate under the control of the processor 312, and thus the mobile device 300 may be switched between receive and transmit modes. In receive mode, the processor 312 couples an antenna 328 to a receiver 326 through a transmit/receive switch 330. The receiver 326 decodes the received signals and provides those decoded signals to the processor 312. In transmit mode, the processor 312 couples the antenna 328 to a transmitter 332 through the switch 330. In one embodiment, the receiver 326 and transmitter 332 support a short range wireless protocol such as IEEE 802.11(a), IEEE 802.11(b), IEEE 802.11(g), IrDA (Infrared Data Association) or Bluetooth.

FIG. 3 also includes a storage module 320 for storing information that may be used during the overall processes of the present invention. Further, the processor 312 operates the transmitter 332 and receiver 326 according to instructions stored in memory 318. In preferred embodiments of the present invention, memory 318 may comprise any one or any combination of non-volatile memory, flash memory or Random Access Memory. A timer module 316 provides timing information to the processor 302 to keep track of timed events.

As shown in FIG. 3, the mobile phone 300 further includes an audio input/output module 334 for allowing the input of audio into the mobile device 300 and the output of audio for listening by a user. The mobile device may also include a user interface 336 for allowing the user to interact with the mobile device 300, for example but not limited to modifying address book information, interacting with call data information and making/answering calls. The mobile device 300 may further include a display module 338 for displaying information to the user of the mobile device 300. The mobile device 300 may also include a Global Positioning System (GPS) module 350 for determining location and/or velocity information of the mobile device 300.

Figure 4:
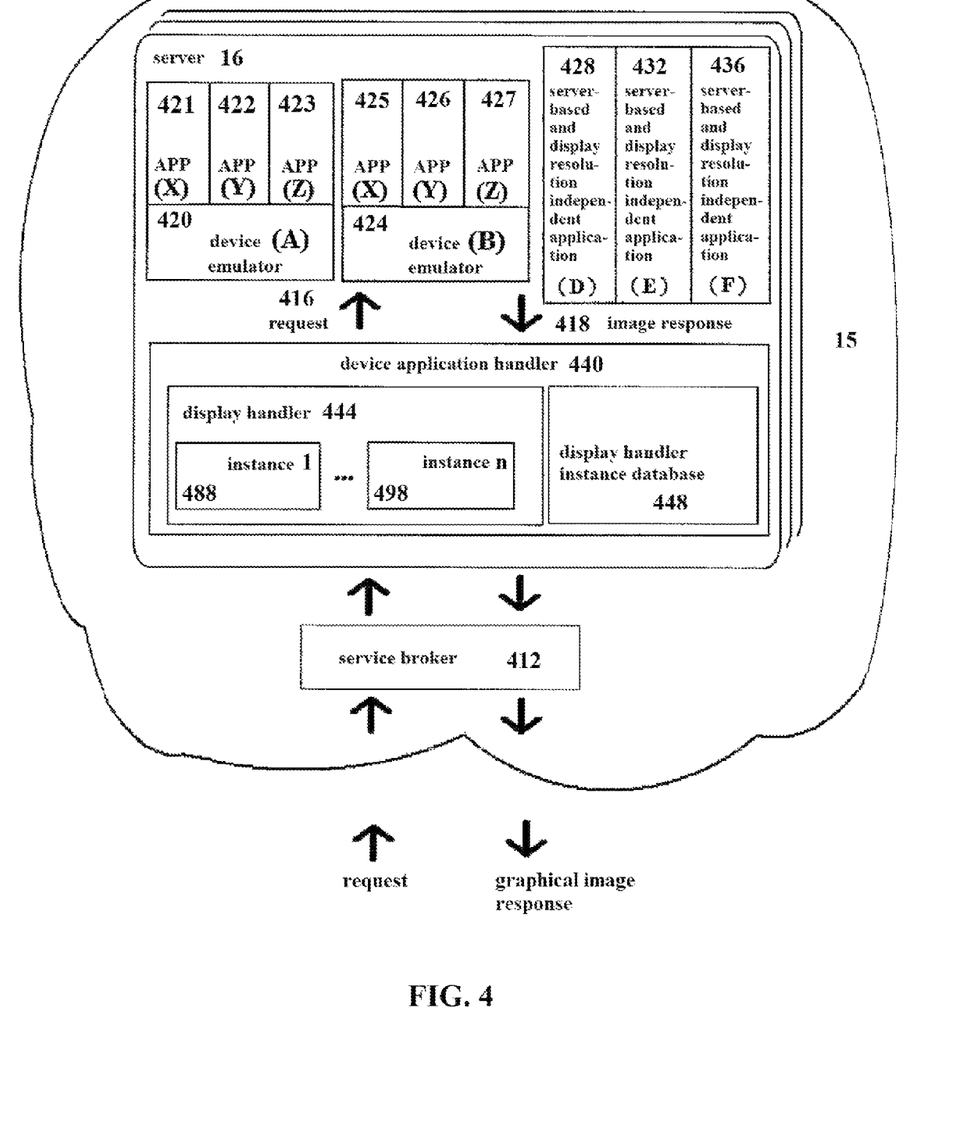
FIG. 4 is an exemplary diagram of a service cloud according to an embodiment of the present invention.
Figure 5:
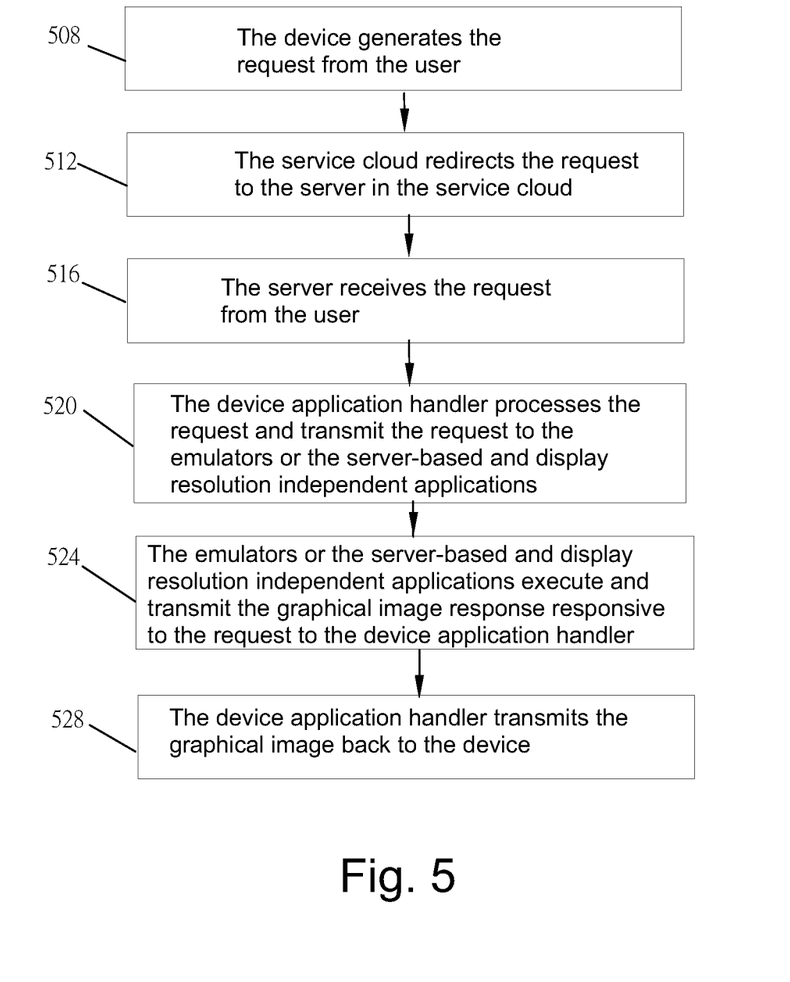
FIG. 5 illustrates a flow diagram of a device independent communication method according to an embodiment of the present invention.

FIG. 4 illustrates an exemplary block diagram of a service cloud 15 according to an embodiment of the present invention. The service cloud 15 includes a plurality of servers 16 and a service broker 412. The service cloud 15 is typically used for dynamically process a large number of services or applications, and in response to a request 416 for a new service or application being received, the service cloud 15 may allow several pre-existing services or applications to serve the request 416. On the other way, the service broker 412 is typically a component that collects the available services or applications in the service cloud 15 and provides the available services or applications to the requestor/client. FIG. 5 shows a block diagram of a device independent communication method according to an embodiment of the present invention. In one embodiment, based on FIG. 1 through FIG. 4, a communication method between a device 10 and a server 16 in a service cloud 15 is shown.

As shown in FIG. 4, according to an embodiment of the present invention, The server 16 may include a plurality of device emulators, such as but not limited to an emulator 420 of device (A) (e.g., the device 20), an emulator 424 of device (B) (e.g., the device 22), and so on. The server 16 may also include one or more server-based and display resolution independent applications, for example a server-based and display resolution independent application (D) 428, a server-based and display resolution independent application (E) 432, a server-based and display resolution independent application (F) 436, and so on. The server 16 may also includes a device application handler 440. For a better explanation, details of the above components will be described later.

In the exemplary embodiment, emulators 420, 424 are typically applications on the information handling system (such as the server 16) that imitates or mimics the functions and displays of the devices 10 through 12. The manufacturers of the devices 10 through 12 or a third party may provide the emulators for use on the server 16. Any actions or tasks that can be executed by the devices 10 through 12 can also be executed by the emulators 420, 424 on the server 16. The emulator 420, 424 on the server 16 also includes a graphical user interface (GUI) which is identical to the physical interface of the device 10 (displayed on the display unit 179 of the device 10, as shown in FIG. 1) such that the GUI is identical to the physical interface of the device 10. Thus, the emulator 420, 424 includes a GUI having the same buttons, display and other input/output mechanisms as the device 10, in addition to the same functions and actions. In addition to imitating the display, buttons and I/O mechanisms of the device 10, the emulator 420, 424 generally imitates the look and feel of the device 10, including the colors used, the styling of the fonts and interface and the textures of the device 10. Also as shown in FIG. 4, emulator 420 may execute application (X) 421, application (Y) 422, application (Z) 423, and so on, wherein application (X) 421, application (Y) 422, application (Z) 423 are the applications based on emulator 420. Also emulator 424 may execute application (X) 425, application (Y) 426, application (Z) 427, and so on, wherein application (X) 425, application (Y) 426, application (Z) 427 are the applications based on emulator 424.

In addition, the emulators 420, 424 on the server 16 may be connected to the device 10 via connection 166 to emulate in real-time the actions and functions of the device 10. Here, to emulate in real-time refers to the near-immediate presence of identical information in both the server 16 and the display unit 179 of the device 10. Thus, as information is input into the device 10 via an IO device such as a keyboard, the information is immediately sent to the emulators 420, 424 in the server 16 for a later processing. For a better explanation, details of the above components will be described later.

Thus, pressing a button on the device 10 is equivalent to pressing the same button on the emulator 420, 424, and vice versa. That is, as the device 10 executes tasks and displays information, the emulator 420, 424 reflects the functions and displays of device 10. Thus, the emulator 420, 424 and the mobile device 10 work in harmony. In this fashion, the emulator 420, 424 acts as a mirror of the device 10.

In one embodiment, the server-based and display resolution independent application (D) 428, the server-based and display resolution independent application (E) 432, or the server-based and display resolution independent application (F) 436 are generally referred to an application executable on the server 16 but unexecutable or improper to be executed on the devices 10 through 12 and the execution result is display resolution independent. For example, the above server-based and display resolution independent applications 428, 432, 436 may be an application in need of complicated computing and unable to be executed on the mobile device, such as but not limited to an image processing editor.

The device application handler 440 is for example a handler for processing the request from the service broker 412, transmitting the request to the target application, receiving the graphical image after the target application being executed in response to the request, and transmitting the graphical image back to the service broker 412. The device application handler 440 includes a display handler 444 and a display handler instance database 448. The display handler 444 is used for the process of generating and maintaining the instances and is responsible for the communications between the mobile device and the application. The display handler instance database 448 includes the information used by the display handler 444. In one embodiment, the display handler instance database 448 may include a list with the following entries: (1) the connected device; (2) the information related to the connected device; (3) the information related to the instances of the applications; and (4) the instances. The information related to the connected device may include OS, resolution, device ID, and so on. The information related to the instances of the applications may include application ID, application type, and so on.

FIG. 5 shows a block diagram of a device independent communication method between a server 16 and a device 10 having a display unit 179 according to an embodiment of the present invention. First, the device 10 generates a request 416 from the user 20 (step 508). In step 512, the service cloud 15 redirects request 416 to the server 16 in the service cloud 16. Then the server 16 receives the request 416 from the user 20 (step 516). In step 520, the device application handler 440 processes the request 416 and transmit the request 416 to the emulator (A) 420, the emulator (B) 424, the server-based and display resolution independent application (D) 428, the server-based and display resolution independent application (E) 432, or the server-based and display resolution independent application (F) 436. Then in step 524, the emulator (A), the emulator (B) 424, the server-based and display resolution independent application (D) 428, the server-based and display resolution independent application (E) 432, or the server-based and display resolution independent application (F) 436 transmit a graphical image response 418 responsive to the request 416 to the device application handler 440. The device application handler 440 then transmits the graphical image 418 to the device 10 (step 528).

Figure 6:
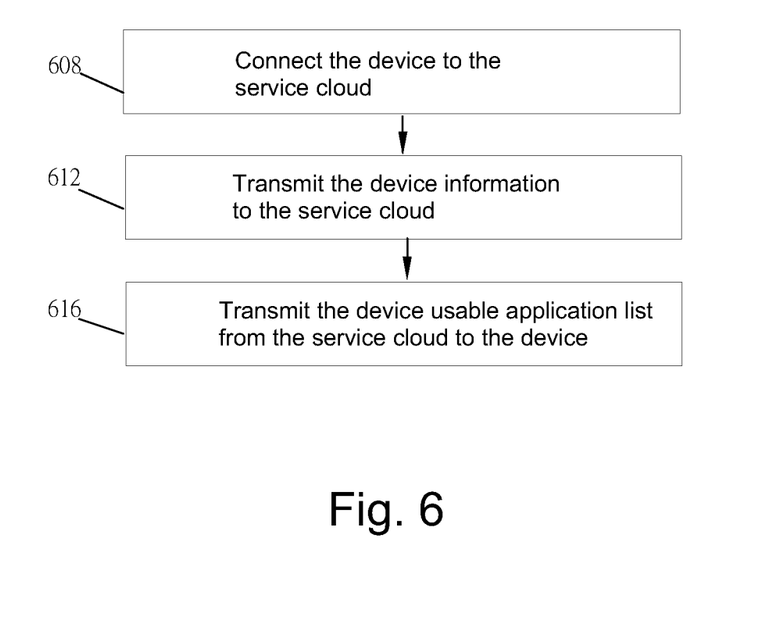
FIG. 6 illustrates a flow diagram of a device independent communication method according to an embodiment of the present invention.

FIG. 6 shows a flow diagram of a method with respect to a device 10 according to an embodiment of the present invention. First, connect the device 10 to the service cloud 15 (step 608). In step 612, transmit the device information (for example but not limited to display resolution, hardware specification, operating system, authentication token, and so on, as shown in Table 1) to the service cloud 15. Then in step 616, the service cloud/the service broker 412 transmits a device usable application list to the device 10.

TABLE 1

| device information | example |
|---|---|
| display resolution | 640X360 |
| hardware specification | CPU: ARM11 434 MHz |
|  | RAM: 128 MB |
|  | ROM: 256 MB |
|  | ... |
|  | ... |
|  | ... |
| device model | Nokia N97 |
| operation system | Symbian S60 V5 |
| authentication token | encrypted id/password |
| ... |  |
| ... |  |
| ... |  |

Figure 7:
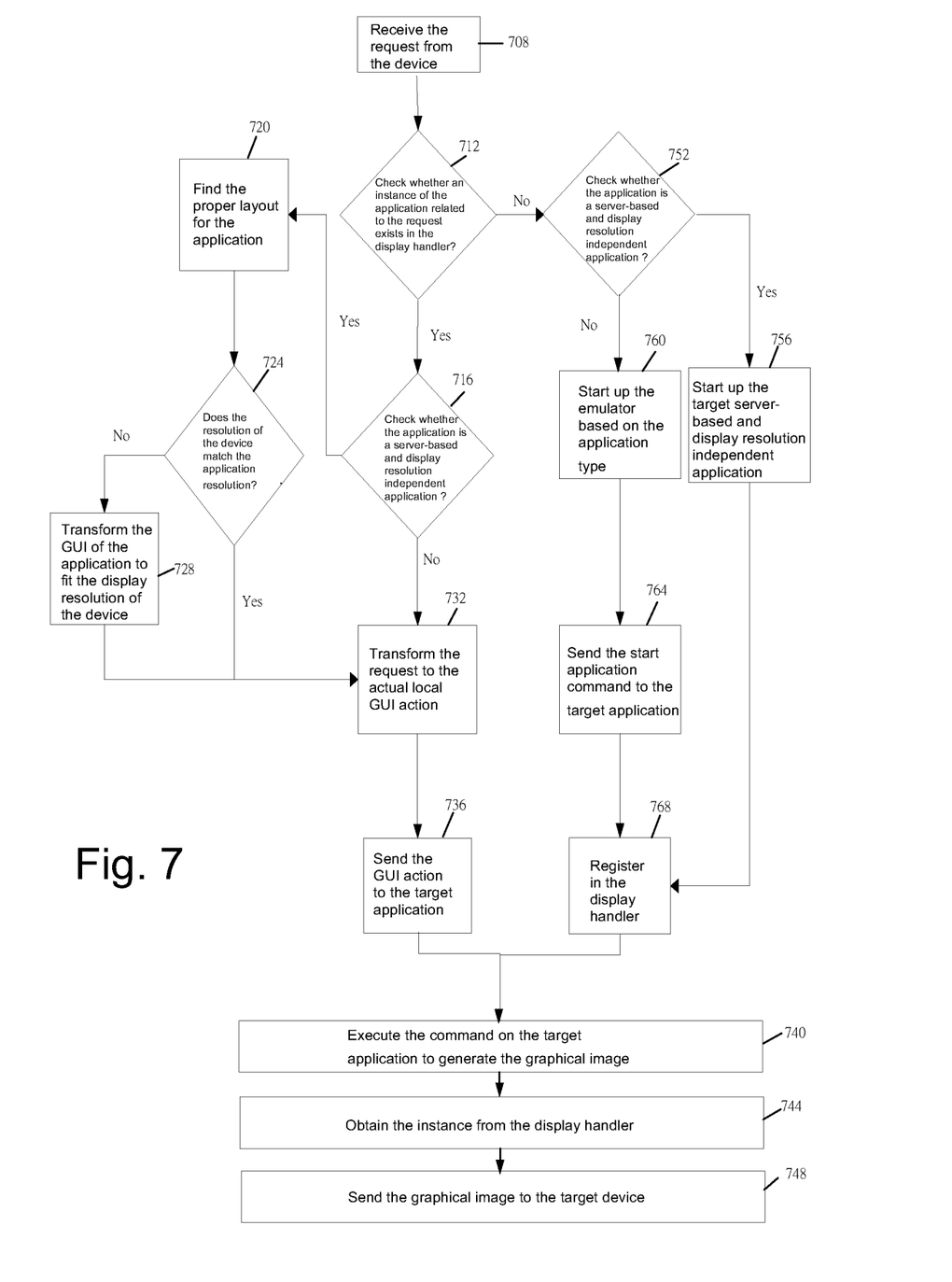
FIG. 7 illustrates a flow diagram of a device independent communication method according to an embodiment of the present invention.

FIG. 7 shows a flow diagram of a method with respect to the service cloud 15/server 16 according to an embodiment of the present invention. First in step 708, receive the request 416 of an application from the device 10. Then in step 712, check whether an instance (out of 488 through 498) of the application related to the request 416 exists in the display handler 444. If yes, the method goes to step 716. If no, the method goes to step 752. In step 716, check whether the application is a server-based and display resolution independent application 428, 432, 436. If yes, the method goes to step 720. If no, the method goes to step 732. In step 720, find the proper layout for the application. In step 724, check whether the resolution of the display unit 179 of the device 10 matches the application resolution. If yes, the method goes to step 732. If no, the method goes to step 728. In step 728, transform the GUI of the application to fit the display resolution of the display unit 179. Then in step 732, transform the request 416 to the actual local GUI action. In step 736, send the GUI action to the target application. In step 740, execute the command on the target application to generate the graphical image response 418. In step 744, get the instance from the display handler 744. In step 748, the graphical image response 418 is transmitted to the target device. The user of the target device can then have a user interaction on the received the graphical image response 418, by conventional input technologies (keyboard input, touch screen input, etc.). For a later user interaction, the afore-mentioned steps may be repeated to achieve the user interaction again.

Further in step 712, if the display handler 444 does not contain the instance (out of 488 through 498) related to the request 416 (in other words, it means a certain application or service in the service cloud 15 is executed by the connected device at the first time), the method goes to step 752. In step 752, check whether the application is a server-based and display resolution independent application 428, 432, 436. If yes, the method goes to step 756. If no, the method goes to step 760. In step 760, start up the emulator 420, 424 based on the application type. In step 764, send the start application command to the target application. In step 768, register the instance of started application in the display handler instance database 448. The method then goes to step 740, step 744, and step 748 as mentioned above.

On the other way, in step 756, start up the target server-based and display resolution independent application. Then in step 768, register the instance of started application in the display handler instance database 448. The method then goes to step 740, step 744, and step 748 as mentioned above.

Figure 8:
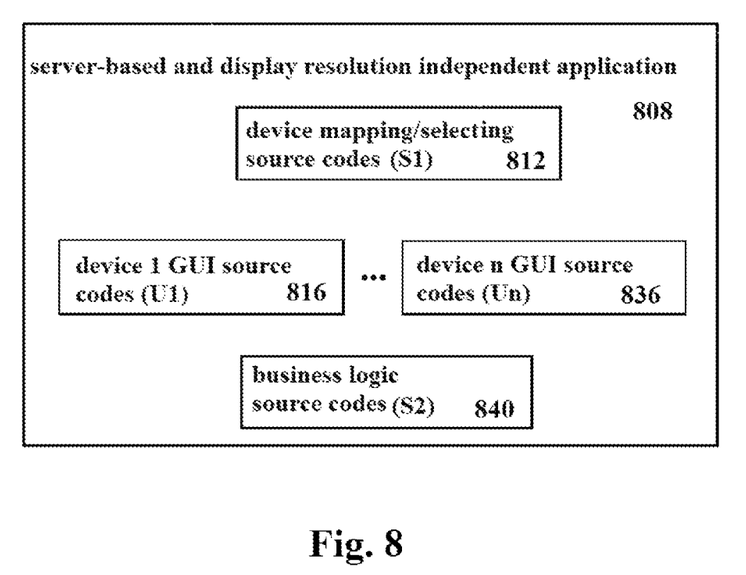
FIG. 8 is an exemplary diagram of a device independent and resolution independent application according to an embodiment of the present invention.

FIG. 8 shows an exemplary diagram of a device independent and resolution independent application 808 according to an embodiment of the present invention. The application 808 includes device mapping/selection source codes (S1) 812, device 1 GUI source codes (U1) 816 through device n GUI source codes (Un) 836, and business logic source codes (S2) 840. After the developer/user completes the GUI layout design for a specific device, the GUI source codes are then generated based on general programming technologies. For the connected device, the device mapping/selection source codes (S1) 812 is used to select/map the proper GUI layout source codes logic. Further, the business logic source codes (S2) 840 are generated based on general programming technologies for the purpose of target business logic. For a better explanation, details of the above application 808 will be described later.

Figure 9:
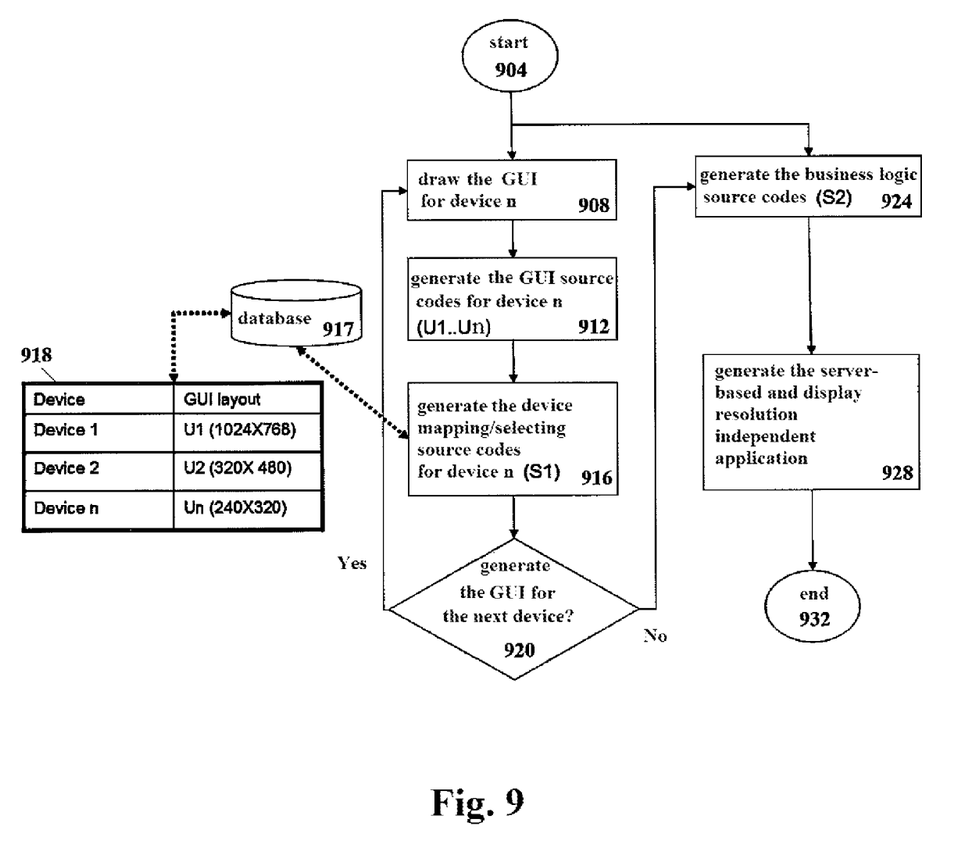
FIG. 9 illustrates a flow diagram of a method to obtain a device independent and resolution independent application according to an embodiment of the present invention.

FIG. 9 is a block diagram showing how to create a device independent and resolution independent application according to an embodiment of the present invention. The method starts at step 904. In step 908, draw the GUI for the device n. In step 912, generate the GUI source codes for device n (U1 . . . Un). In step 916, generate device mapping/selecting source codes (S1) for device n, and it includes a mapping table 918 indicating a relation between device 1 through device n and the resolution of the display unit 179, as shown in FIG. 9. Then in step 920, check whether a GUI is created for the next device. If yes, the method goes to step 908 and repeat the above steps. If not, the method goes to step 924.

Step 924 may be parallelly processed with step 908. In step 924, create the business logic source codes (S2). In step 928, generate the server-based and display independent application (step 932). The method ends at step 932. In other words, for device n, the developer/user generates the GUI layout and then GUI source codes (Un) 836. Then the developer/user generates the device mapping/selection source codes (S1) 812 with the mapping table 918 (the mapping table 918 is stored in the database 917). Then in step 920, determine whether a GUI for another device is generated. If yes, the above steps are repeated. On the other way, in step 924, the business logic source codes (S2) 840 are also generated based on general programming technologies. Then in step 928, based on the above-mentioned source codes, the server-based and display independent application 428, 432, 436 are completed.

Figure 10:
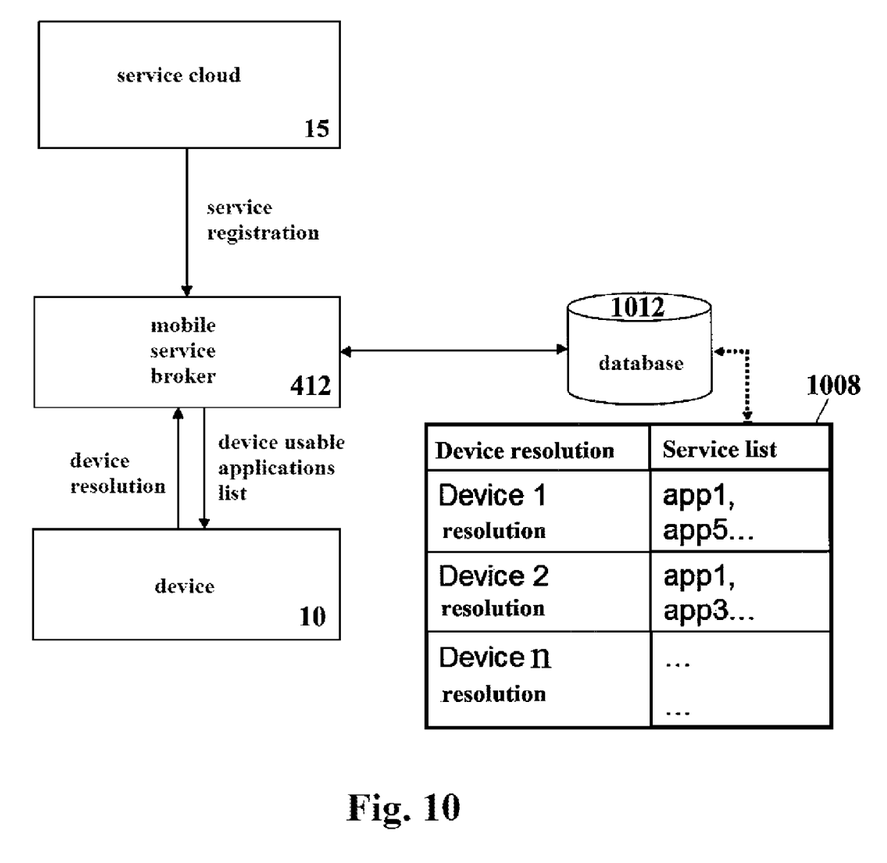
FIG. 10 is an exemplary diagram of transmitting to a device a list of applications usable by the device according to an embodiment of the present invention.

FIG. 10 shows an exemplary diagram of transmitting to the device 10 a list of applications usable by the device according to an embodiment of the present invention. As shown in FIG. 10, the service cloud 15 processes a service registration to the service broker 412. The service broker 412 transmits the device usable application list to the device 10, and the device 10 transmits the device resolution information to the service broker 412. The service broker 412 stores the mapping information list to a mapping information database 1012. FIG. 10 also illustrates the exemplary mapping information 1008, and the device usable application list is generated based on the mapping information list 1008.

Based on the above-mentioned steps and components, as shown in FIG. 1, a list 151 having one or more applications usable by the device 10 is shown on the GUI 181 of the device 10, and the list 151 illustrate, for example, the icons of the usable applications 191 through 199. The user can then select one application out of applications 191 through 199 from the list 151 by conventional input/output technologies, such as the keyboard input or the touch screen input.

In the exemplary embodiment, a communication protocol may be defined for the above communication connection. One exemplary protocol may include: source IP, destination IP, screen size, resolution, OS type, content, and so on. Regarding the communication from the client to the server, the protocol may include: event [position/action], wherein the action is related various input/output devices, such as the keyboard, the touch screen, the mouse, and so on, and the action may include keying a key, touching a screen, moving a mouse cursor, and so on. Regarding the communication from the server to the client, the protocol may include: a frame of a graphical image (e.g., a bitmap image), available application list, and so on.

Under the above protocol, an example of communication between the device 10 and the server 16 is illustrated as follows. For example, when the device 10 transmits the request to make connections with server 16, the device 10 needs to provide the specific device information to the server 16 and the following information is embedded in the communication protocol:

| Source IP | Dest. IP | Screen size | Resolution | OS type | event: connect |
|---|---|---|---|---|---|

After the server 16 receives the device connection request from the device 10, the server 16 will accept it and send the device usable application list to the device 16. The exemplary protocol may be:

| Source IP | Dest. IP | Screen size | Resolution | OS type | Compatible application list |
|---|---|---|---|---|---|

After the device 10 receives the device usable application list, the device 10 will decode the list and display the list on the display unit 179 of the device 10. The user 20 can select any desired application on the list. After the user 20 clicks on the selected application, the device 10 transmits the request back to the server 16. Based on the above-mentioned methods and components, the server 16 may find the proper emulator 420, 424 or the proper server-based and display independent application 428, 432, 436 and then let it executed. The graphical image of the execution result is then transmitted back to the device 10. The received graphical image is shown on the display unit 179 of the device 10, and the user 20 may see the execution result as if the application is executed by the device 10.

In view of the above, under the defined protocol, other communications between the device 120 and the server 16 are also shown. For example, after the server 16 receives the connection request from the device 10, a proper application is started and the defined protocol may be:

| Source IP | Dest. IP | Screen size | Resolution | OS type | event: application name |
|---|---|---|---|---|---|

When the server 16 transmits the graphical image, the defined protocol may be:

| Source IP | Dest. IP | Screen size | Resolution | OS type | bitmap image |
|---|---|---|---|---|---|

When the device 10 transmits the request, the defined protocol may be:

| Source IP | Dest. IP | Screen size | Resolution | OS type | event/action: click button |
|---|---|---|---|---|---|

In one exemplary embodiment, a user of a mobile phone Nokia N97 (Symbian based) intends to use a calculator application, but the calculator application can only be run on Window Mobile 6. According to the present invention, Nokia N97 is used to connect to the service broker 412, and the service broker 412 transmits back the device usable application list to the device 10. After the user 20 chooses the calculator application based on Window Mobile 6, the emulator 420 of the server 16 sends back a graphical image (for example, a bitmap image) as the execution result. A user interaction is made with the graphical image by the user based on convention user interaction technologies, and the corresponding instructions are sent to the server 16. The above steps are repeated until the user 20 ends the use of the application. Nokia is a registered trademark of Nokia Corporation. Windows Mobile is a registered trademark of Microsoft Corporation in the United States and/or other countries. Symbian is a trademark of Symbian Foundation Limited.

In another exemplary embodiment, a user of a mobile phone N97 sends a request to connect to the service cloud 15. The applications in the service cloud 15 may be respectively Window Mobile 6-based, Android-based, or iOS-based. Android is a registered trademark of Google Inc. When the device 10 sends out the connection request to the server 16, the communication protocol may be:

Source IP (Device's IP)=140.112.56.32
Destination IP (Mobile Service Broker IP)=140.110.32.21
Screen size=3.5 inch
Resolution=640×360
OS type=Nokia Symbian
Event=Connect After the server 16 receives the connection request of the device 10, the server 16 will transmit the device usable application list to the device 10. The communication protocol may be:

Destination IP (Mobile Service Broker IP)=140.110.32.21
Source IP (Device's IP)=140.112.56.32
Screen size=3.5 inch
Resolution=640×360
OS type=Nokia Symbian
application list for device n (Nokia N97) with 640×360 resolution=Calculator on Windows Mobile 6, Calendar on Android, Map on iPhone After the server 16 receives the connection request of the device 10, the selected application is started. The communication protocol may be:

Source IP (Device's IP)=140.112.56.32
Destination IP (Mobile Service Broker IP)=140.110.32.21
Screen size=3.5 inch
Resolution=640×360
OS type=Nokia Symbian
event=Calculator on Windows Mobile 6

When the server 16 transmits the graphical image, the communication protocol may be:

Destination IP (Mobile Service Broker IP)=140.110.32.21
Source IP (Device's IP)=140.112.56.32
Screen size=3.5 inch
Resolution=640×360
OS type=Nokia Symbian
bitmap image=0010011000 (calculator bitmap)

When the device 10 sends out the request again, the communication protocol may be:

Source IP (Device's IP)=140.112.56.32
Destination IP (Mobile Service Broker IP)=140.110.32.21
Screen size=3.5 inch
Resolution=640×360
OS type=Nokia Symbian
event=Click digit "2"

In the above two embodiments, the devices used by the users are mobile phones. However, other devices may also be used, for example but not limited to push-to-talk mobile phones, pagers, text message devices, email message devices, desktops, laptops, tablet computers, handheld computers, servers, or the like.

In accordance with the illustrative embodiments of the present invention, for various devices, responsive to the request, the applications can be executed regardless of the OS/platform. In other word, the purpose of platform independent applications can be easily achieved. Thus, the limitations in prior communication technologies, such as the CPU and memory restrictions or the problems resulting from the complicated applications as described previously, can be effectively solved. In addition, the emulators or the server-based and display resolution independent application in the aforementioned embodiments can provide a satisfactory solution of executing an application on various devices/operating systems/hardware specifications. The graphical image transmitted from the service cloud 15 can be adjusted in a real-time manner to match the device 10 sending out the request.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of a communication between a server and a device, comprising:
   providing a plurality of pre-existing services or applications by a server in a service cloud, the server comprising,
      a plurality of device emulators corresponding to a plurality of devices, respectively emulating functions and displays of the plurality of devices, and
      a device application handler for receiving a request from a first device and transmitting the request to the device emulator corresponding to the first device;
   generating, by the device emulator corresponding to the first device, a graphical image indicative of an execution of the application;
   transmitting, by the device application handler, the graphical image to the first device; and
   transmitting to the first device by a service broker arranged between the service cloud and the first device, a list having one or more applications usable by the first device based on a device information obtained by the service broker from the first device.

2. The method of claim 1, wherein the server selects a device emulator corresponding to the selected application; and the server executes the corresponding emulator to generate the graphical image.

3. The method of claim 1, wherein a display unit is arranged for the device and the display unit has a display unit resolution; wherein a server-based and display resolution independent application is arranged on the server.

4. The method of claim 3, wherein the server selects a graphical image layout corresponding to the display unit based on the display unit resolution; and executes the server-based and display resolution independent application to generate the graphical image.

5. An information handling system in response to a request of a first device, the request corresponding to an application, comprising:
   a server in a service cloud, providing a plurality of pre-existing services or applications, the server comprising,
      a plurality of device emulators corresponding to a plurality of devices, respectively emulating functions and displays of the plurality of devices;
      a device application handler for receiving the request of the first device and transmitting the request to the device emulator corresponding to the first device;
      wherein the device emulator corresponding to the first device generates a graphical image indicative of an execution of the application and the device application handler transmits the graphical image to the first device; and
   a service broker arranged between the service cloud and the first device for transmitting a list having one or more applications usable by the first device to the first device, based on a device information obtained by the service broker from the first device.

6. A server in response to a request of a device, the request corresponding to an application and the application being a server-based and display resolution independent application, the device having a display unit, the display unit having a resolution, comprising:
   a corresponding server-based and display resolution independent application for generating a graphical image indicative of an execution of the server-based and display resolution independent application in response to the request and for adjusting a size of the graphical image to be adapted for the display unit based on the resolution of the display unit;
   a server in a service cloud, providing a plurality of pre-existing services or applications, the server comprising,
      a device application handler for receiving the request of the device and transmitting the request to the corresponding server-based and display resolution independent application;
      wherein the device application handler transmits the adjusted graphical image to the device; and
      a service broker arranged between the service cloud and the first device for transmitting a list having one or more applications usable by the first device to the first device, based on a device information obtained by the service broker from the first device.

7. An executable software product stored on a non-transitory computer-readable storage medium containing program instructions for communication between a server and a device, the program instructions for:
  providing a plurality of pre-existing services or applications by a server in a service cloud, the server comprising,
    a plurality of device emulators corresponding to a plurality of devices, respectively emulating functions and displays of the plurality of devices, and
    a device application handler for receiving a request from a first device and transmitting the request to the device emulator corresponding to the first device;
  generating, by the device emulator corresponding to the first device, a graphical image indicative of an execution of the application;
  transmitting, by the device application handler, the graphical image to the first device; and
  transmitting to the first device by a service broker arranged between the service cloud and the first device, a list having one or more applications usable by the first device based on a device information obtained by the service broker from the first device.

8. The executable software product of claim 7, wherein the server selects a device emulator corresponding to the selected application; and the server executes the corresponding emulator to generate the graphical image.

9. The executable software product of claim 7, wherein a display unit is arranged for the device and the display unit has a display unit resolution; wherein a server-based and display resolution independent application is arranged on the server.

10. The executable software product of claim 9, wherein the server selects a graphical image layout corresponding to the display unit based on the display unit resolution; and the server executes the server-based and display resolution independent application to generate the graphical image.

* * * * *